(12) United States Patent
Bao et al.

(10) Patent No.: US 8,777,107 B1
(45) Date of Patent: Jul. 15, 2014

(54) WHEEL TYPE LASER ENCODING DEVICE AND CODE READING METHOD

(71) Applicant: Shanghai Shengxiang Science and Technology Co., Ltd, Shanghai (CN)

(72) Inventors: Chengfan Bao, Shanghai (CN); Xiuzhi Zhang, Shanghai (CN)

(73) Assignee: Shanghai Shengxiang Science and Technology Co., Ltd., Shanghai (CN)

( * ) Notice: Subject to any disclaimer, the term of this patent is extended or adjusted under 35 U.S.C. 154(b) by 0 days.

(21) Appl. No.: 13/870,879

(22) Filed: Apr. 25, 2013

(51) Int. Cl.
*G06K 7/10* (2006.01)
*G06K 19/06* (2006.01)

(52) U.S. Cl.
USPC ............ 235/462.03; 235/462.01; 235/462.04; 235/462.38; 235/469

(58) Field of Classification Search
USPC ............. 235/461.01, 462.03, 462.04, 462.09, 235/462.1, 462.12, 462.14, 462.38, 462.4, 235/469
See application file for complete search history.

(56) References Cited

U.S. PATENT DOCUMENTS

| 3,636,317 | A | * | 1/1972 | Torrey | 235/494 |
| 4,166,574 | A | * | 9/1979 | Yokoyama | 235/375 |
| 5,332,895 | A | * | 7/1994 | Rieder et al. | 250/231.14 |
| 5,861,613 | A | * | 1/1999 | Apelberg et al. | 235/454 |
| 6,550,677 | B1 | * | 4/2003 | Imai et al. | 235/454 |
| 7,380,717 | B2 | * | 6/2008 | Lubow | 235/462.01 |
| 7,621,459 | B2 | * | 11/2009 | Hovis | 235/494 |
| 2008/0011854 | A1 | * | 1/2008 | Idaka | 235/462.01 |
| 2009/0224032 | A1 | * | 9/2009 | Kondou et al. | 235/375 |
| 2011/0215149 | A1 | * | 9/2011 | Ohmae | 235/437 |

* cited by examiner

*Primary Examiner* — Tuyen K Vo
(74) *Attorney, Agent, or Firm* — Raymond Y. Chan; David and Raymond Patent Firm

(57) ABSTRACT

A roller laser encoding apparatus includes a barcode formed on a curved surface to form a curved barcode surface wherein the barcode is a sequence of different color laser reflectivity. When a laser transmitter emits a laser beam toward the curved barcode surface, the laser beam is reflected by the curved barcode surface to form a reflected laser beam. After the reflected laser beam is received by a laser receiver as a light signal, the optoelectronic converter converts the light signal of the reflected laser beam into a voltage signal. After the curved barcode surface is rotated in one revolution, an encoding processor collects the voltage signals from the optoelectronic converter in sequent and generates a sequence of voltage value in response to the sequence of different color laser reflectivity of the curved barcode surface so as to output a decoding signal of the curved barcode surface.

4 Claims, 3 Drawing Sheets

| Serial Number | Sampled Value | Serial Number | Sampled Value | Serial Number | Sampled Value | Serial Number | Sampled Value |
|---|---|---|---|---|---|---|---|
| 1 | 799 | 17 | 1533 | 33 | 1602 | 49 | 892 |
| 2 | 801 | 18 | 1600 | 34 | 1601 | 50 | 800 |
| 3 | 802 | 19 | 1602 | 35 | 1602 | 51 | 800 |
| 4 | 895 | 20 | 1600 | 36 | 1530 | 52 | 801 |
| 5 | 1570 | 8 | 1601 | 37 | 891 | 53 | 800 |
| 6 | 1601 | 22 | 1598 | 38 | 801 | 54 | 799 |
| 7 | 1600 | 23 | 1597 | 39 | 799 | 55 | 801 |
| 8 | 1540 | 24 | 1537 | 40 | 907 | 56 | 899 |
| 9 | 900 | 25 | 902 | 41 | 1542 | 57 | 1563 |
| 10 | 800 | 26 | 800 | 42 | 1603 | 58 | 1601 |
| 11 | 800 | 27 | 803 | 43 | 1600 | 59 | 1600 |
| 12 | 801 | 28 | 889 | 44 | 1599 | 60 | 1538 |
| 13 | 801 | 29 | 1520 | 45 | 1598 | 61 | 910 |
| 14 | 802 | 30 | 1600 | 46 | 1599 | 62 | 802 |
| 15 | 801 | 31 | 1602 | 47 | 1601 | 63 | 801 |
| 16 | 911 | 32 | 1602 | 48 | 1534 | 64 | 798 |

| Serial Number | Sampled Value | Serial Number | Sampled Value | Serial Number | Sampled Value | Serial Number | Sampled Value |
|---|---|---|---|---|---|---|---|
| 1 |  | 17 |  | 33 |  | 49 |  |
| 2 | 801 | 18 | 1600 | 34 | 1601 | 50 | 800 |
| 3 | 802 | 19 | 1602 | 35 | 1602 | 51 | 800 |
| 4 |  | 20 |  | 36 |  | 52 |  |
| 5 |  | 8 |  | 37 |  | 53 |  |
| 6 | 1601 | 22 | 1598 | 38 | 801 | 54 | 799 |
| 7 | 1600 | 23 | 1597 | 39 | 799 | 55 | 801 |
| 8 |  | 24 |  | 40 |  | 56 |  |
| 9 |  | 25 |  | 41 |  | 57 |  |
| 10 | 800 | 26 | 800 | 42 | 1603 | 58 | 1601 |
| 11 | 800 | 27 | 803 | 43 | 1600 | 59 | 1600 |
| 12 |  | 28 |  |  |  | 60 |  |
| 13 |  | 29 |  |  |  | 61 |  |
| 14 | 802 | 30 | 1600 | 46 | 1599 | 62 | 802 |
| 15 | 801 | 31 | 1602 | 47 | 1601 | 63 | 801 |
| 16 |  | 32 |  | 48 |  | 64 |  |

FIG. 5

WHEEL TYPE LASER ENCODING DEVICE AND CODE READING METHOD

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a laser encoding apparatus, more particularly to a roller laser encoding apparatus with a corresponding decoding method to decode a barcode printed on a curved surface.

2. Description of Related Arts

The continuously development of the laser encoding technology brings a convenience for human's life. However, the existing laser encoding technology has several drawbacks and needs to be improved to enhance the practical use thereof.

Generally, a conventional laser barcode is printed on a flat surface, such as a paper, wherein the conventional laser decoding apparatus, i.e. the decoder, such as a camera or a laser scanner, reads the barcode on the flat surface in order to decode the value of the barcode. The major drawback of the barcode encoding device is that the regular laser barcode are unable to print on a curved surface and a revolving surface. Even if the laser barcode is printed on the curved surface or the revolving surface, the decoder is unable to read and decode the barcode. Since the curved surface or the revolving surface is not a planar surface, the conventional laser decoding apparatus is unable to capture the entire picture of the laser barcode or scan the entire laser barcode in a three dimensional manner. In other words, the value from the laser barcode cannot be obtained.

SUMMARY OF THE PRESENT INVENTION

A main object of the present invention is to provide a roller laser encoding apparatus to overcome the existing problems of how to provide a barcode on a curved surface or a revolving surface. In addition, a decoder is able to precisely read the barcode on the curved surface or the revolving surface.

Accordingly, in order to accomplish the above object, the present invention provides a roller laser encoding apparatus, The roller laser encoding apparatus comprises a barcode formed on a curved surface to form a curved barcode surface, a motor for driving the curved barcode surface to revolve, and a barcode decoding device. The barcode decoding device comprises a laser transmitter, a laser receiver, and an optoelectronic converter, and an encoding processor, wherein the barcode formed on a curved surface is a sequence of different color laser reflectivity. When the laser transmitter emits a laser beam toward the curved barcode surface, the laser beam is reflected by the curved barcode surface to form a reflected laser beam. After the reflected laser beam is received by the laser receiver as a light signal, the optoelectronic converter converts the light signal of the reflected laser beam into a voltage signal. After the curved barcode surface is rotated in one revolution, the encoding processor collects the voltage signals from the optoelectronic converter in sequent and generates a sequence of voltage value in response to the sequence of different color laser reflectivity of the curved barcode surface so as to output a decoding signal of the curved barcode surface.

In accordance with another aspect of the invention, the present invention comprises a specific decoding method to decode the coding value of the curved barcode which comprises the following steps.

(1) Rotate a curved barcode surface provided on an outer surface of a rotating wheel in one full revolution and then receiving reflected light reflected by the curved barcode surface.

(2) In response to a light intensity of the curved barcode surface, transform a light signal of the reflected light into a voltage signal, and comparing a voltage value of the voltage signal with a reference voltage value in order to distinguish whether the voltage signal is a high electronic level signal or a low electronic level signal;

(3) In response to one revolution of the curved barcode surface, sample the voltage values and transforming the voltage values into a sampled voltage sequence;

(4) In response to a preset coding density, group the sampled voltage sequence into the corresponding numbers of coding zone;

(5) Remove an interference number from each group by determining a width ratio of a width of a color bar in the curved barcode surface and a width of a light reflective interfering zone at a margin of the color bar, and then determining an occurrence frequency of the high and low electronic levels;

(6) Determine whether the coding zone is a high electronic level zone or a low electronic level zone, wherein if the occurrence frequency of high electronic level is higher than the occurrence frequency of low electronic level within the coding zone, the coding zone is defined as a high electronic level zone, wherein if the occurrence frequency of low electronic level is higher than the occurrence frequency of high electronic level within the coding zone, the coding zone is defined as a low electronic level zone;

(7) configuring the high electronic level zone as the number of "1", and the low electronic level zone as the number of "0" to form a binary coding sequence as a decode of the curved barcode surface.

Preferably, the step (1) further comprises a step of rotating the rotating wheel in a constant rotational speed.

In addition, in the step (3), a sampling frequency must be at least double of a ratio of a circumference of the rotating wheel and a length of a light reflective interfering zone at a margin of a color bar in the curved barcode surface.

According to the present invention, the roller laser encoding apparatus can encode the barcode on the curved surface and can decode the barcode on the curved surface through the revolution of the curved surface. Therefore, the present invention is able to print the barcode on the curved surface, especially the flat or planner surface has insufficient printing area for the barcode, so as to successfully provides an economic and efficient solution to solve the existing problem of inapplicable of applying the barcode on the curved surface or a revolving surface.

Still further objects and advantages will become apparent from a consideration of the ensuing description and drawings. These and other objectives, features, and advantages of the present invention will become apparent from the following detailed description, the accompanying drawings, and the appended claims.

BRIEF DESCRIPTION OF THE DRAWINGS

FIG. 5 is a table illustrating the sampling data after removing two the interfering numbers according to the preferred embodiment of the present invention.

DETAILED DESCRIPTION OF THE PREFERRED EMBODIMENT

In order to show and describe for the purpose and skills of the present invention, below will combine preferred embodiments to further illustrate the functional and structural principles of the present invention.

Figure 1:
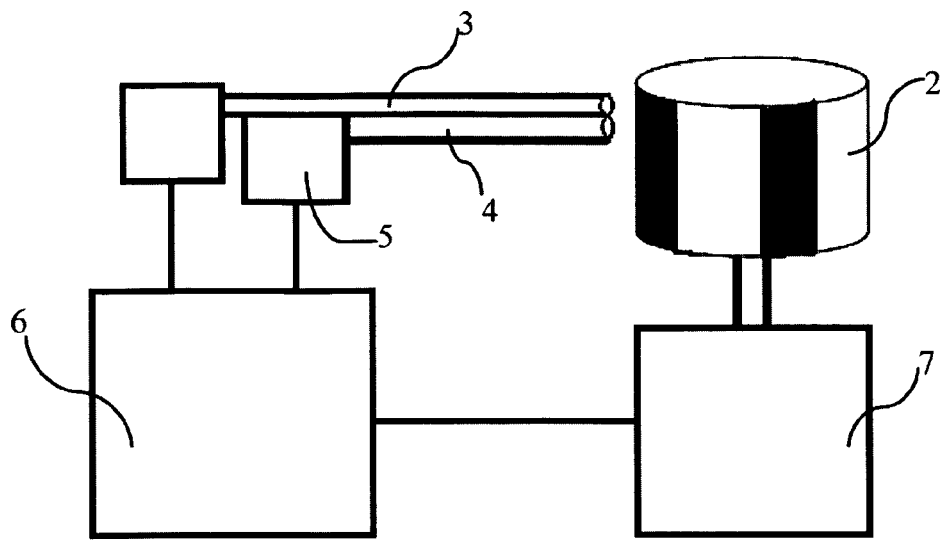
FIG. 1 is a schematic view of a roller laser encoding apparatus according to the preferred embodiment of the present invention.

Referring to FIG. 1 of the drawings, a roller laser encoding apparatus is illustrated, wherein the roller laser encoding apparatus comprises a barcode on a curve surface to form a curved barcode surface 2, a laser transmitter 3, a laser receiver 4, an optoelectronic converter 5, an encoding processor 6, and a motor 7 for driving the curved barcode surface 2 to revolve to form a revolving surface.

Accordingly, the motor 7 is connected with the encoding processor 6 via an input-output bus in order to drive to rotate the curved barcode surface 2. The laser transmitter 3 is connected with the encoding processor 6 via the input-output bus. The laser receiver 4 is connected with the optoelectronic converter 5 via proximity and non-contact mechanical connection. Also, the optoelectronic converter 5 is connected with the encoding processor 6 via the input-output bus.

The encoding processor 6 provides a pulse current which is controlled by a clock controller via the input-output bus in order to control the motor 7 for driving the curved barcode surface 2 to rotate. At the same time, the laser transmitter 3 is activated, via the input-output bus, to emit an emitting laser beam to the curved barcode surface 2, wherein the emitting laser beam is reflected by the curved barcode surface 2 to form a reflected laser beam. The reflected laser beam is received by the laser received 4 to form an optical signal, wherein after the optical signal is transmitted to the optoelectronic converter 5, the optical signal is transformed to a voltage signal. According to the integral multiple of pulse frequency of the clock controller, the encoding processor 6 samples the voltage signals from the optoelectronic converter 5. The sampled voltage signal is transformed to a digitized sequence signal through an analog-digital (AD) converter. Finally, the digitized sequence signal is transformed to the coding information following by a decoding algorithm. In other words, the encoding processor 6 collects the voltage signals from the optoelectronic converter 5 in sequent and generates a sequence of voltage value in response to the sequence of different color laser reflectivity of the curved barcode surface 2 so as to output a decoding signal of the curved barcode surface 2.

Figure 2:
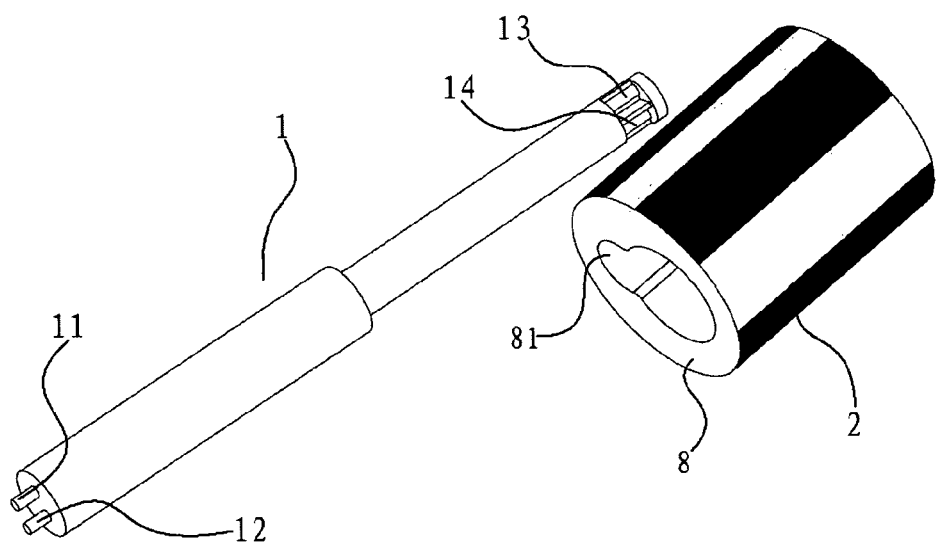
FIG. 2 is a perspective view of a roller laser encoding apparatus according to the preferred embodiment of the present invention.

Referring to FIG. 2, according to the preferred embodiment of the present invention, the barcode on the curved barcode surface 2 is printed on the outer surface of the rotating wheel 8 having a cylindrical shape. The barcode formed on a curved surface is a sequence of different color laser reflectivity. The barcode on the curved barcode surface 2 has two different color bars, preferably black and white or two different colors having large difference of lighting absorption rate.

At the same time, the laser transmitter 3 comprises a light emitting optical fiber 11 and a light emitting lens 13 arranged in such a manner that when the laser beam is emitted by the light emitting optical fiber 11, the laser beam is reflected by the light emitting lens 13 to align with and project on the outer surface of the rotating wheel 8. The laser receiver 4 comprises a light receiving optical fiber 12 and a light receiving lens 14 aligned with and aimed at the outer surface of the rotating wheel 8. Each lens surface is tangent to the outer surface of the rotating wheel 8 when each of the light emitting lens 13 and the light receiving lens 14 is aligned with the outer surface of the rotating wheel 8. Preferably, each lens surface is in a vertical position when aligning with the outer surface of the rotating wheel 8. The light emitting lens 13 and the light receiving lens 14 located adjacent with each other and form a fiber probe 1.

During decoding process, the light emitting optical fiber 11 emits the laser beam, wherein the laser beam is reflected by the light emitting lens 13 and is projected on the outer surface of the rotating wheel 8 in order to read the barcode on the curved barcode surface 2. The motor 7 is activated to drive the rotating wheel 8 to rotate at a constant rotating speed. During the rotating operation of the rotating wheel 8, the laser beam is reflected on the outer surface of the rotating wheel 8 and is received by the light receiving lens 14. The reflected laser beam is transmitted to the light receiving optical fiber 12 from the light receiving lens 14 in order to form a received laser beam.

Figures 3, 4:
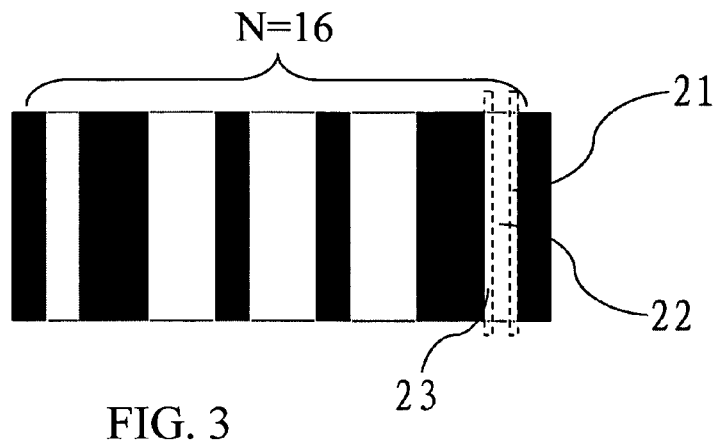
FIG. 3 illustrates the scanned barcode according to the preferred embodiment of the present invention.
FIG. 4 is a table illustrating the sampling data being collected according to the preferred embodiment of the present invention.

It is worth mentioning that the rotating wheel 8 has a positioning groove 81 provided at an inner axle of the rotating wheel 8, such that through the positioning groove 81, the entire barcode on the curved barcode surface 2 can be read when the rotating wheel 8 is rotated in one single revolution, as shown in FIG. 3. In other words, a completed and non-repeated barcode on the curved barcode surface 2 will be read through the one full revolution of the rotating wheel 8.

A decoding method of the roller laser encoding apparatus of the present invention comprises the following steps.

(1) Revolve the rotating wheel 8, preferably, in one full revolution, wherein the curved barcode surface 2 is provided the outer surface of the rotating wheel 8. During the rotating process, the laser beam is reflected on the outer surface of the rotating wheel 8 and is received by the light receiving lens 14. The reflected laser beam is transmitted to the light receiving optical fiber 12 from the light receiving lens 14 in order to form a received laser beam.

(2) Transform the optical signal of the received laser beam into the voltage signal. Accordingly, since the barcode on the curved barcode surface 2 has two different color bars, preferably black and white or two different colors having large difference of lighting absorption rate, the light intensities of the received laser beam will be different respect to two different color bars. Therefore, the optoelectronic converter 5 is able to convert the received laser beam with respect to different light intensities to different voltage values. For example, when the light intensity of the received laser beam is higher than a preset threshold, a first voltage value is obtained. When the light intensity of the received laser beam is lower than the preset threshold, a second voltage value is obtained. The first and second voltage values can be a high electrical level and a low electrical level respectively.

(3) Sample the voltage values transformed from the received laser beam by the encoding processor 6 via one full revolution of the rotating wheel 8, so as to obtain the voltage values from the light intensities of the received laser beam into a sampled voltage sequence.

At the margin of one color bar, the light intensity of the reflected laser beam will be interfered by the adjacent color bar due to the rotational movement of the rotating wheel 8. Therefore, the sampling frequency must be higher than, preferably at least double, the ratio of the circumference of the rotating wheel 8 and the length of the light reflective interfering zone at the margin of the color bar. The length of the light reflective interfering zone equals to the outer diameter of the rotating wheel 8. The laser frequency reflective ratio of each of two color bars, the coding density, and the rotational speed of the motor output can be measured by experiment.

(4) Determine sampled voltage sequence as a corresponding coding number, according to the pre-designed coding density. For example, a coding number "X" could be expressed as a number of bits N of a binary mode, such that the coding density is defined as a number "N", and the outer surface of the rotating wheel 8 is divided into N sections. As shown in FIG. 3, the curved barcode surface 2 is illustrated in a planar manner, wherein the coding density is configured as a value of 16. In other words, the outer surface of the rotating wheel 8 is divided into 16 sections at its circumference. The coding number is encoded into 16 different color bars. Therefore, the 16-bit binary code X could be expressed from 0000H to FFFFH.

(5) Determine the interference value of the curved barcode surface 2. Accordingly, a width ratio is determined that the width ratio is a ratio between a width of the color bar and a width of the light reflective interfering zone at the margin of that color bar. The interference value will be eliminated by the width ratio. As shown in FIG. 3, the light reflective interfering zone 21 (shown in the dotted area) is the interfering zone of the white bar 22 which is interfered by the adjacent black bar. Since a partial light spot from the adjacent color bar will fall within the light reflective interfering zone 21, the light reflective intensity will be weaker than its original reflective intensity. Therefore, there two light reflective interfering zones formed at two margins of each color bar respectively. As shown in FIG. 3, another light reflective interfering zone 23 is shown. In a given value of L, k, N, and V, λ and S will be determined by experiment, wherein λ is a width ratio λ of the width of the color bar and the width of the light reflective interfering zone 23, wherein S is the sampling frequency, wherein L is the outer diameter of the rotating wheel 8, wherein k is the light reflective ratio between the two color bars, wherein N is the coding density, wherein v is the rotational speed of the motor output. The followings are the experimental procedure:

1) Estimate the value of "λ" depending on the experience. For example, supposing the value of "λ" is 1/50 which means the overall width of the light reflective interfering zones at two margins of the color bar is 1/50 of the entire width of the coding section. Therefore, the coding density will be 2*(N/λ). In other words, the coding density in this example is 1600.

2) Having 1600 of the sampling frequency S in one full revolution, the coding section will be used in one single color, such as only black bars or white bars. In this example, only white bars are used. An analog sequence is sampled and collected, wherein the analog sequence will be converted into a digitized sequence by the optoelectronic converter 5. The digitized samples in the digitized sequence are in form of V1, V2, V3, . . . V1600. The median Vm of the digitized sequence is determined in order to determine a ratio D. The ratio D is the largest offset between the median Dm and each of the digitized sample Vn, wherein the formula of ratio D is represented as D=(Vn−Vm)max/Vm, wherein n=1 to 1600.

3) Exchange to the color-alternating encoding wheel which has the order of color sections are white, black, white, black . . . etc. Then follow the step 2) to collect 1600 sampling data. One hundred digitized sampled values are taken from each of the coding zone, and defined as Vs1, Vs2, Vs3 . . . Vs100. The median of Vs1 to Vs100 is defined as Vsm, and the ratio "Dsn" is defined as Dsn=(Vsn−Vsm)/Vsm wherein n=1~100. In other words, the ratio Dsn is the largest offset between the median Vsm and each of the digitized sampled value Vsn. If the value of Ds1 and Ds100 are larger than the value of "D" mentioned in step 2), and Ds2, Ds3, . . . Ds99 are small than the value of "D" mentioned in step 2), the step (3) must be repeated by multiple time. If the result are satisfied with the requirement mentioned above, i.e. equal to or higher than 99%, the value of "S" could be defined as "S"=1600.

(6) Determine a sampling median of light reflective intensity of the digitized sampling sequence converted by the optoelectronic converter 5 after obtaining the sampling frequency S, and determining the color bars, the rotational speed of the motor output, and laser frequency and intensity, wherein the total sample number of a single rotating wheel has to be larger than a thousand. Accordingly, a weak light reflective bar (i.e. weak light reflective intensity, which is the black bar in the present invention) is set, wherein the weak light reflective intensity values after the optoelectronic converter 5 are shown as Vw1, Vw2, . . . VwS, so as to determine the weak light reflective intensity median Vwm. A high light reflective bar (i.e. strong light reflective intensity, which is the white bar in the present invention) is set, wherein the high light reflective intensity values after the optoelectronic converter 5 are shown as Vb1, Vb2, . . . VbS, so as to determine the high light reflective intensity median Vbm. The reflective ratio, with respect to the laser beam, between the high and weak light reflective intensities is defined as "k"=(Vbm−Vwm)/Vbm, and the value of k/2 must be larger than a normal number "Q". In addition, the value of "Q" must be larger than the value of (Vwn−Vwm)max/Vwm, and also larger than the value of (Vbn−Vbm)max/Vbm, wherein n=1~S. Preferably, Q=5%. It is available to apply different values of "Q" measured by the experiment, but at least the value of "Q" must be larger than 5 percent. Finally, after more than 1000 experiments, the average laser reflective ratio "k" is calculated.

(7) Set up a reference voltage value "Vstd" defined as the value of Vbm−Vwm+k*Vbm/2. Accordingly, the color bar coding is configured at the outer surface of the rotating wheel 8 to form the curved barcode surface 2 as follows. By using the light intensity, frequency, the rotational speed of the motor output, and the sampling frequency S, a set of voltage values V1, V2, V3, . . . VS will be obtained. Then, the voltage values will be divided into N groups with respect to the coding density, wherein the values for groups are Vs1, Vs2 . . . Vsn. In particular, the light reflective interfering zones at two margins of each group will be removed by its value of (SN)*λ/2.

(8) Compare the remaining voltage values with the reference voltage value "Vst". The voltage value which is larger than the reference number value Vst is defined as the high electronic level while the voltage value which is smaller than the reference number value Vst is defined as the low electronic level. If the number of high electronic level recorded is much more than the number of the low electronic level recorded, such as 10 times more, the code zone is defined as high electronic level code zone, whereas if the number of high electronic level recorded is much less than the number of the low electronic level recorded, the code zone is defined as low electronic level code zone.

(9) Obtain a binary coding sequence by defining the high electronic level zone as 1, and the low electronic level zone as 0.

The above are the descriptions of the structure of roller laser encoding apparatus and the laser decoding method, below further describe the specific implementation of the roller laser encoding apparatus.

As shown in FIG. 2 to FIG. 3 of the drawings, the color bars which are applied to the coding sections of the present invention are white and black respectively, wherein the RGB value of the white section is (0x000000), the RGB value of black section is (0xFFFFFF). The encoding wheel is made of a quartz reflection material. The laser transmitter 3 incorporates with a laser tube having 780 nm in size and 10 mW in intensity, and a 0.9 mm diameter quartz optical fiber. The laser receiver 4 incorporates with a 3 mm diameter quartz optical fiber. The optoelectronic converter 5 incorporates with a silicon pipe. The motor 7 is a step-motor for driving the curved barcode surface 2 to rotate. The encoding processor is an ARM7 processor, wherein the white bar is the high light reflective bar (high light reflection with respect to the laser beam) while the black bar is the weak light reflective bar (weak light reflection with respect to the laser beam). FIG. 3 illustrates the surface of the encoding wheel in a planner manner, wherein the surface thereof is divided to 16 coding sections with respect to its circumference. The color order from left to right is "black, white, black, black, white, white, black, white, white, black, white, white, black, black, white, black", and the corresponding coding number of the binary mode is defined as "0100110110110010".

According to the result measured from the experiment of the present invention, the width ratio $\lambda$ of the width of the color bar and the width of the light reflective interfering zones at two margins of the color bar is ½. For example, the two light reflective interfering zones 21, 23 at the two margins of the white bar 22 are interfered by the two adjacent black bars. The length of the light reflective interfering zone 21 is d1 while the length of the light reflective interfering zone 23 is d2. The length of the white bar is d3. Therefore, the value of "$\lambda$," is equal to (d1+d3)/d2=½.

According to the value of "$\lambda$" mentioned above, the sampling frequency S is equal to 64 which is calculated from the equation of $2*(N/\lambda)$. Therefore, sampling frequency S is $2*(16/(½))=64$.

In step (6), taking 1000 samples form a white coding wheel and taking 1000 samples from a black coding wheel for this experiment, the median Vbm of the light reflective intensities for the white bar 9 (Vb1 to Vbs) is 1600 and the median Vwm of the light reflective intensities for the black bar (Vw1 to Vws) is 800. The ratio, which is the largest offset between the median Vbm and each white digitized sample Vb is 1%. The ratio, which is the largest offset between the median Vbm and each black digitized sample Vw is 0.03%. The value "Q" can be set as 10% while the value of "k" can be determined as 50%. According to the formula of k/2>Q, the value of Vst is 1200 which is calculated from 1600−800+(1600*50%/2)=1200.

During the decoding procedure, the ARM provides a pulse current which is controlled by a clock controller in order to control the step motor 7 for driving to rotate the rotating wheel 8 uniformly. At the same time, the laser tube is activated to emit the emitting laser beam to the light emitting lens 13, wherein the laser beam is then reflected by the outer surface of the encoding wheel to form the reflected laser beam. The light receiving optical fiber 12 receives the reflected laser beam through the light receiving lens 14, wherein the reflected laser beam as the light signal is then transformed into the voltage signal via the silicon pipe. The ARM will take the samples by the sampling frequency at 64 samples per cycle and will convert the samples into digital form via the analog-digital (AD) converter.

According to the preferred embodiment of the present invention, the sampling data is shown in FIG. 4.

The above data are divided into 16 groups according to the coding density N=16 and the corresponding serial number of the 16 groups are (1~4), (5~8), (9~12)...(61~64). According to step (7), the values, i.e. the interfering number, of the light reflective interfering zones at two margins of each group are eliminated. According to this example, the value of $(S/N)*\lambda/2$ is equal to 1, i.e. the interfering number, so that one data from the two ends of each group have to be removed. For example, the serial number of the first group is (1, 2, 3, 4). After removing two the interfering numbers from two ends of each group, the serial number is being changed to (2, 3). Finally, the remaining data are shown in FIG. 5.

The remaining serial numbers of each group are changed to (2, 3), (6, 7), (10, 11)...(58, 59), (62, 63). According to step (8), the sampled value will be compared with the reference number Vst. For example, the sampled value of serial number 2 is 801 which is smaller than the value of Vst=1200, so that the sampled value of serial number 2 is defined as low electronic level. Also, the sampled value of the serial number 3 is 802 which is smaller than the value of Vst=1200, so that the sampled value of serial number 3 is defined as the low electronic level. In this coding zone (2, 3), it has two low electronic levels and no high electronic level, so that this coding zone (2, 3) could be defined as the low electronic level zone. Moreover, the low electronic level zone is defined as the number "0" by using the binary mode. Therefore, the data of the table 2 could be expressed as a number of sequences of 0, 1, 0, 0, 1, 1, 0, 1, 1, 0, 1, 1, 0, 0, 1, 0 which is consistent with the coding sequence of a binary mode "0100110110110010".

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A roller laser encoding apparatus, comprising a barcode formed on a curved surface to form a curved barcode surface, a motor for driving said curved barcode surface to revolve, and a barcode decoding device, wherein said barcode decoding device comprises a laser transmitter, a laser receiver, and an optoelectronic converter, and an encoding processor, wherein said barcode formed on a curved surface is a sequence of different color laser reflectivity, wherein when said laser transmitter emits a laser beam toward said curved barcode surface, said laser beam is reflected by said curved barcode surface to form a reflected laser beam, wherein after said reflected laser beam is received by said laser receiver as a light signal, said optoelectronic converter converts said light signal of said reflected laser beam into a voltage signal, wherein after said curved barcode surface is rotated in one revolution, said encoding processor collects said voltage signals from said optoelectronic converter in sequent and generates a sequence of voltage value in response to said sequence of different color laser reflectivity of said curved barcode surface so as to output a decoding signal of said curved barcode surface.

2. A decoding method of a roller laser encoding apparatus, comprising the steps of:
   (1) rotating a curved barcode surface provided on an outer surface of a rotating wheel in one full revolution and then receiving reflected light reflected by said curved barcode surface;
   (2) in response to a light intensity of said curved barcode surface, transforming a light signal of said reflected light into a voltage signal, and comparing a voltage value of said voltage signal with a reference voltage value in order to distinguish whether said voltage signal is a high electronic level signal or a low electronic level signal;
   (3) in response to one revolution of said curved barcode surface, sampling said voltage values and transforming said voltage values into a sampled voltage sequence;
   (4) in response to a preset coding density, grouping said sampled voltage sequence into the corresponding numbers of coding zone;
   (5) removing an interference number from each group by determining a width ratio of a width of a color bar in said curved barcode surface and a width of a light reflective interfering zone at a margin of said color bar, and then determining an occurrence frequency of said high and low electronic levels;
   (6) determining whether said coding zone is a high electronic level zone or a low electronic level zone, wherein if said occurrence frequency of high electronic level is higher than said occurrence frequency of low electronic level within said coding zone, said coding zone is defined as a high electronic level zone, wherein if said occurrence frequency of low electronic level is higher than said occurrence frequency of high electronic level within said coding zone, said coding zone is defined as a low electronic level zone;
   (7) configuring said high electronic level zone as the number of "1", and said low electronic level zone as the number of "0" to form a binary coding sequence as a decode of said curved barcode surface.

3. The decoding method, as recited in claim 2, wherein the step (1) further comprises a step of rotating said rotating wheel in a constant rotational speed.

4. The decoding method, as recited in claim 2 wherein, in the step (3), a sampling frequency must be at least double of a ratio of a circumference of said rotating wheel and a length of a light reflective interfering zone at a margin of a color bar in said curved barcode surface.

\* \* \* \* \*